No. 834,836. PATENTED OCT. 30, 1906.
J. C. MILLER.
PULL ROD COUPLING.
APPLICATION FILED APR. 17, 1906.
2 SHEETS—SHEET 1.
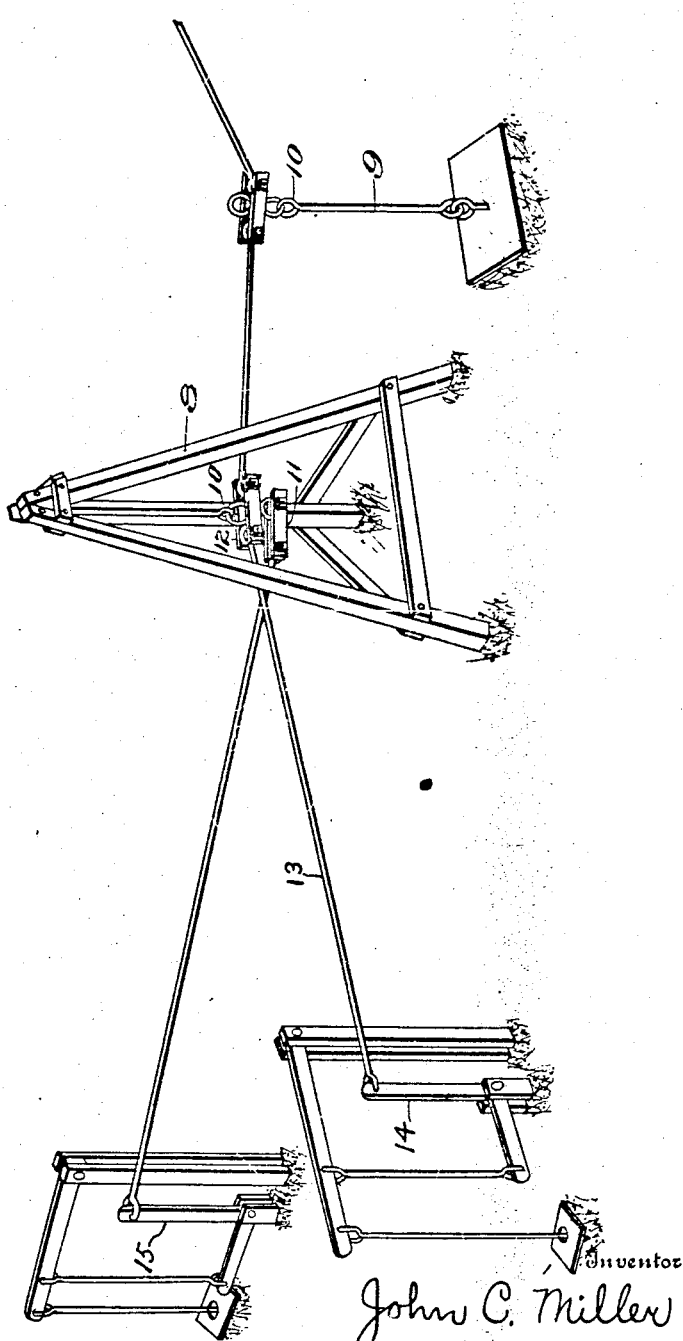

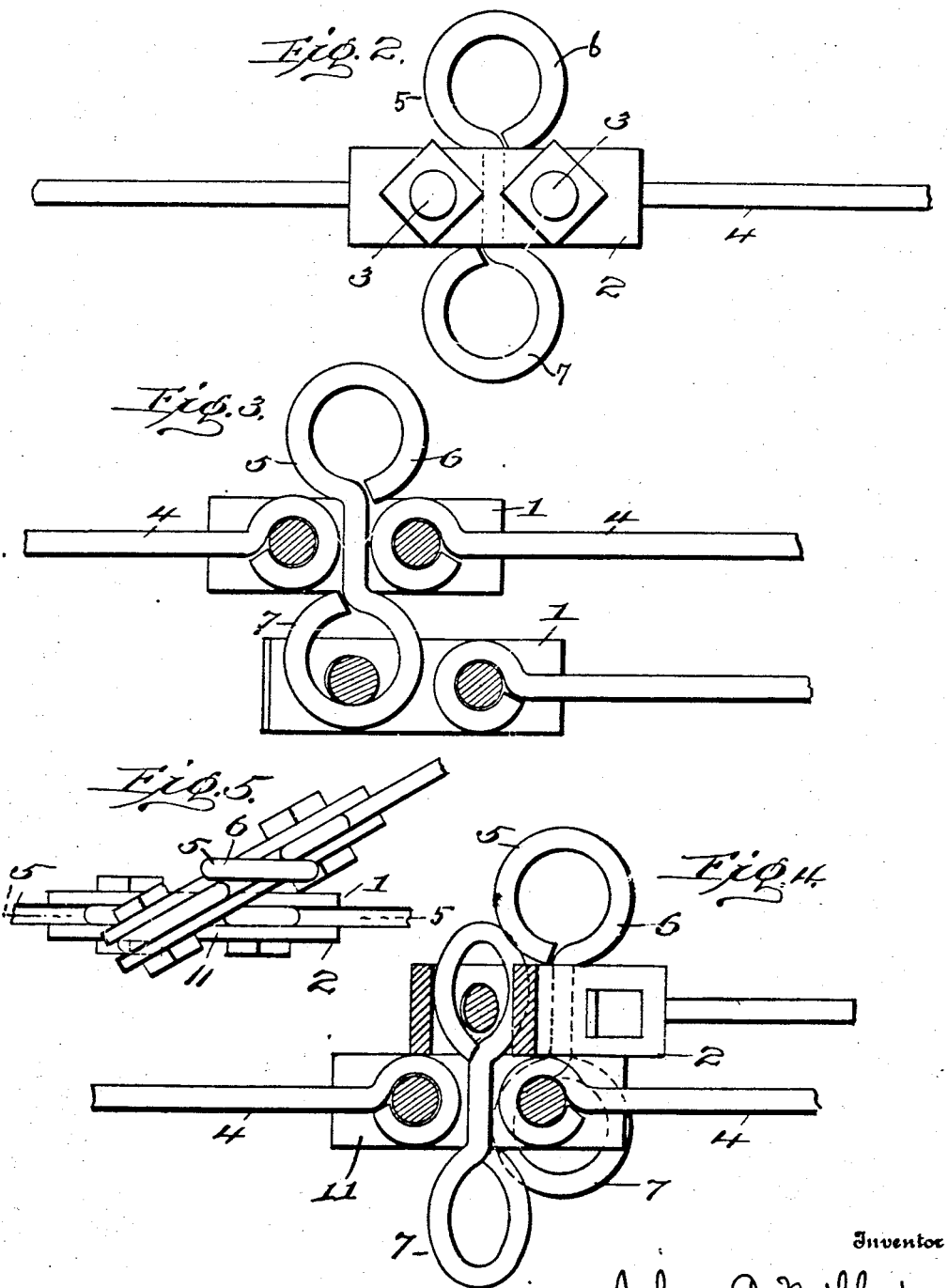

UNITED STATES PATENT OFFICE.

JOHN C. MILLER, OF OIL CITY, PENNSYLVANIA.

PULL-ROD COUPLING.

No. 834,836. Specification of Letters Patent. Patented Oct. 30, 1906.

Application filed April 17, 1906. Serial No. 312,248.

*To all whom it may concern:*

Be it known that I, JOHN C. MILLER, a citizen of the United States, residing at Oil City, in the county of Venango and State of Pennsylvania, have invented certain new and useful Improvements in Pull-Rod Couplers; and I do hereby declare the following to be a full, clear, and exact description of the invention, such as will enable others skilled in the art to which it appertains to make and use the same.

This invention relates to pull-rod couplers that are especially adapted to be used in transmitting power from a central station to any convenient points over a specified and limited field.

The invention comprises the construction of a coupler having a supporting S-shaped member, clamps for securing the same in position, and rods pivotally mounted upon said clamping member.

The object in view is the production of a pull-rod coupler having means for pivotally securing the same to standards from above or below, as may be desired.

A further object in view is the production of means for coupling two or more couplers together for transmitting power at an angle to the main transmission of power.

A still further object of the invention is the production of an S-shaped member for mounting the coupler in place, clamping members securing the S-shaped member in place, and pull-rods pivotally mounted between the clamping members.

With these and other objects in view the invention comprises certain novel constructions, combinations, and arrangements of parts, as will be hereinafter fully described and claimed.

In the drawings, Figure 1 is a perspective view of a system of pull-rods and couplers embodying the features of my invention. Fig. 2 is a side elevation of the preferred form of my invention. Fig. 3 is a vertical section of a slightly-modified form of my invention, the same showing a coupling member carried by the preferred form of my invention. Fig. 4 is a vertical section on line 5 5 of Fig. 5. Fig. 5 is a top plan view of the coupler embodying the features of my invention with a second coupler secured to the same and adapted to transmit motion at an angle thereto.

In oil-fields it is necessary to have means for pumping oil from the wells, and it is found very undesirable and expensive to mount an engine at each well, and therefore it is common to have a large power-engine located at a convenient point to a number of wells, so that power may be transmitted from the engine to the various wells. This is accomplished in many ways, the most common of which is through the reciprocation of pull-rods. To this form of transmission of power my invention relates, and more particularly to the coupler employed for securing together the various pull-rods and adapting the same to be placed at various angles to the main line of power transmission.

My invention is also particularly adapted to be used in oil-fields where it is necessary to transmit power over uneven surfaces, and therefore the pull-rods must be so mounted as to be supported from above when passing over small rises or held to the earth when passing through ravines and the like.

In the preferred embodiment of my invention I provide a pair of clamping members 1 and 2, which are adapted to be secured in place by any suitable means, as 3 3. To the securing means 3 3 is pivoted the horizontal pull-rods 4 4 now used in most oil-fields. Mounted between the pull-rods 4 4 is an approximately S-shaped member 5, which is preferably made from bar metal bent into the desired shape. The ends of the S-shaped member 5 are closed, so as to form ring-shaped portions 6 and 7.

In use the pull-rod coupler is mounted either on a supporting means, as the tripod 8, or the restraining-rod 9 by means of the S-shaped member 5. A hook or eye portion 10 is passed through the ring portion 6 of the member 5 and securely holds the coupler in position, but permits the same to oscillate, as may be desired.

In operation it is often desirable that power should be transmitted from the main transmission-line at a slight angle, and in order to accomplish this I mount a second coupler, as 11, below the coupler 12 on the main power-line. In mounting a second coupler on the main coupler 12 in order to transmit power at an angle thereto I preferably remove the S-shaped member 5, as will be clearly seen in Fig. 3 of the drawings. The main line may be connected to a pumping device 14, if desirable, and the side line to another similar device, as 15, or, if preferable, both or either lines may be used to drive any other machine which a reciprocating motion will operate. In case power is desired to be transmitted at more than one angle at a single point along the main power-transmission line the S-shaped member is left in position, as seen in Fig. 5, and the pull-rod secured to the ring-shaped member 6 or 7, as may be desired. I thus form a coupler with the pull-rods pivotally secured thereto that may be used on any ground, regardless of the unevenness thereof, and the pull-rod may be kept in operative position by suspending the coupler by means of the S-shaped member 5. In case the tendency of the pull-rods is to rise from the ground then a securing means is secured to the S-shaped member, so as to firmly hold the coupler down to its position near the earth. In this way my invention is equally adapted to being swung, as on a pendulum, to prevent the power from drawing the rod down or may be anchored to the ground to prevent the power from raising the pull-rod too high in the air with equal adaptability.

What I claim is—

1. A pull-rod coupler comprising clamping members, means for securing the same together, and a substantial S-shaped member secured between the said clamping members for holding the pull-rod in position.

2. A pull-rod coupler comprising clamping members, pull-rods pivotally mounted therein, and means having looped ends loosely mounted between said clamping members for securing the said coupler in position.

3. A pull-rod coupler comprising clamping members, means for pivotally mounting pull-rods between the same, and an S-shaped supporting member secured between said clamping members.

4. A pull-rod coupler comprising side members, means for securing the same together, means positioned between said side members for holding the same in operative position, a loop formed integral with said sustaining means and a second coupler positioned at an angle to the said coupler, and sustained in position by said loop.

5. A pull-rod coupler comprising clamping members, means for pivotally mounting the pull-rods therebetween, and an S-shaped member mounted between said pull-rod and said clamping means and having the loops projecting above and below said clamping means, the upper loop of said S-shaped member sustaining the coupler in position and lower loop accommodating a pull-rod positioned at an angle to said coupler.

In testimony whereof I affix my signature in presence of two witnesses.

JOHN C. MILLER.

Witnesses:
A. McFATE,
JOHN M. McGILL.